(No Model.) 2 Sheets—Sheet 1.
C. J. KINTNER.
ELECTRIC MOTOR.

No. 457,902. Patented Aug. 18, 1891.

Witnesses
Geo. W. Breck.
Edward Thorpe

Inventor
Charles J. Kintner (No Model.)

C. J. KINTNER.
ELECTRIC MOTOR.

No. 457,902. Patented Aug. 18, 1891.

Witnesses
Geo. W. Breck
Edward Thorpe

Inventor
Charles J. Kintner

UNITED STATES PATENT OFFICE.

CHARLES J. KINTNER, OF NEW YORK, N. Y.

ELECTRIC MOTOR.

SPECIFICATION forming part of Letters Patent No. 457,902, dated August 18, 1891.

Original application filed June 14, 1890, Serial No. 355,412. Divided and this application filed October 1, 1890. Serial No. 366,725.

(No model.)

*To all whom it may concern:*

Be it known that I, CHARLES J. KINTNER, a citizen of the United States, residing at New York, county and State of New York, have made a new and useful Invention in Electric Motors, of which the following is a specification.

My invention is directed particularly to improvements in electric motors for use in connection with ventilating-fans, although many of the details of construction hereinafter described are clearly applicable to electric motors or dynamo-machines under varying conditions and uses.

I make no claim in the present application to an armature having vertical movement into and out of the magnetic field in combination with a fan secured to one end of the armature-shaft; nor do I claim a divided field-core having a sliding armature vertically suspended between the field-poles, as these features are claimed in another pending application filed by me in the United States Patent Office on the 14th day of June, 1890, bearing Serial No. 355,412, of which application the present application is a division in so far as it relates to methods of operation disclosed in the aforesaid application.

My invention will be fully understood by referring to the accompanying drawings, in which—

Figure 1:
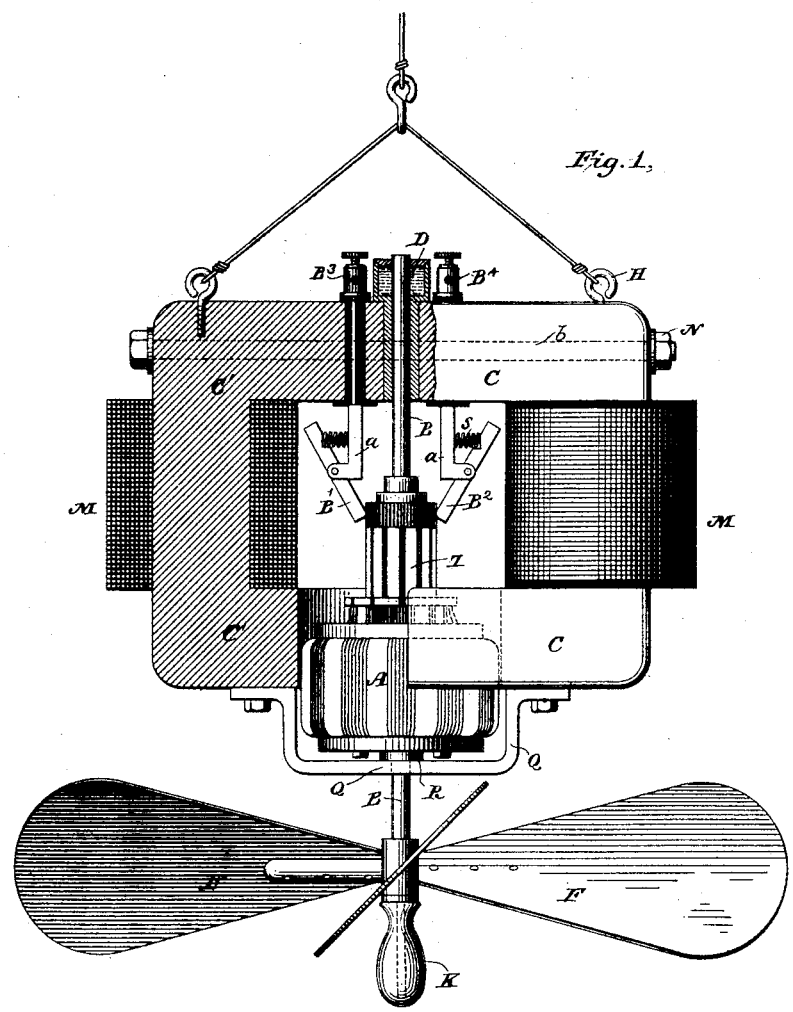
Figure 2:
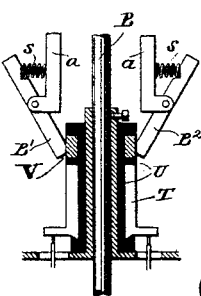
Figure 3:
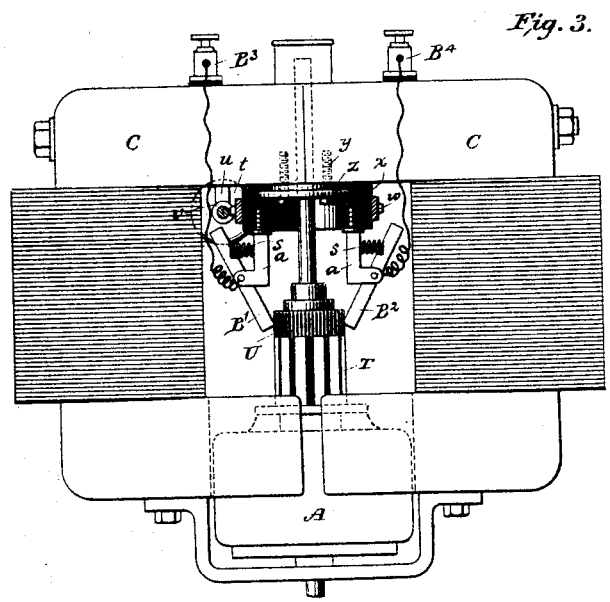
Figure 4:
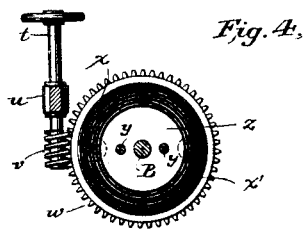

Figure 1 is a side elevational view of the entire apparatus, shown partly in section. Fig. 2 is a detail view of a modified form of the cut-out apparatus. Fig. 3 is a side elevational view of one of my improved forms of motors, with my improved means of adjustment and regulation for commutator-brushes. Fig. 4 is a detail plan view of the commutator-regulating apparatus.

Referring to the drawings in detail, M M represent the field-magnet coils.

C C' represent the field-magnet cores, made in two parts secured together by bolts $b$ and nuts N, as fully described in my prior application.

A is the armature carried by the shaft B, having vertical movement in a long journal-bearing provided with an oil-cup D at its upper end.

Q is a non-magnetic yoke, which supports the armature and its attached fan F when the motor is not operating, said parts being supported on this yoke Q by a bearing R.

K is a sleeve, made of insulating material, loosely journaled on the lower end of the shaft B.

T represents the commutator-strips, which are normally out of circuit with the pivoted brushes B' B², carried by arms $a$ $a$, insulated from the field-magnet cores and provided with binding-posts B³ B⁴, said commutator-brushes having spiral springs $s$, which normally tend to force them against an insulating-ring, as clearly shown in Fig. 1.

The motor shown in Fig. 1 is of series-wound form, and the circuit is normally broken at the armature by the insulating-ring upon which the brushes B' B² rest.

When it is desired to set the fans F in motion, the attendant grasps the sleeve K and forces the shaft B into its uppermost position, so that the commutator-brushes B' B² are brought into contact with the commutator-strips T. Immediately the circuit is set up through the armature and the field-coils, and the magnetic effect of the cores C C' upon the iron core of the armature A, together with the lifting effect of the fans, is such as to retain the armature and all of its attached parts in an operative position, so that the attendant may now release his hold of the sleeve K, and the armature will continue to maintain this position until it is pulled down by again grasping the sleeve K. Should there be an increase of current through the motor, it will immediately regulate itself by the lifting effect of the fans F, which tend to lift the armature out of the field, the counteracting magnetic effect of the field-cores upon the armature tending to act, in turn, as a brake thereon. It will thus be seen that, by reason of the fact that the armature A and its attached parts are carried suspended in the air, I am enabled to overcome approximately all of the friction which would result from the weight of said parts were they allowed to rest upon their journal-bearings. I also afford, by the attraction between the field-cores and the armature, together with the lifting effect of the fan-blades, a simple and efficient method and means of regulation for the motor, thereby combining a method of regulation and a method of cutting the same out of and into circuit without the addition of any apparatus other than is found in existing types of motors. In other words, I cause the well-known parts of existing forms of motors to be so arranged as to effectually regulate the speed of the motor and at the same time overcome a very large proportion of the friction due to the moving parts.

In the modified form of cut-out apparatus shown in Fig. 2 the brushes B' B² are caused to rest upon a conducting-ring V when the armature is in its lowermost position, so that the current is short-circuited around the armature, the brushes B' B² being of sufficient width to bridge the insulating-space U between the ring V and the commutator-strips T, in order to prevent any break in the circuit during the time that the motor is either being cut out of or into circuit, the object of this arrangement being to adapt motors of this type for use in series circuits.

In Fig. 3 I disclose my improved form of commutator holding and adjusting device, in which $x$ is a collar of insulating material held in position by a disk $z$, the latter being secured to the field-yoke by screws $y$ $y$, the brush-holders $a$ being secured in said insulating-ring, as clearly shown. The collar $x$ is adapted, as shown, to rotate around the fixed disk $z$, and carries a gear-wheel $w$ on its outer rim, which meshes with a worm $v$ on the end of a thumb-shaft $t$, the latter being secured to the field-magnet yoke by a standard $u$.

The operation of the apparatus is apparent, it being understood that by the rotation of the thumb-shaft $t$ the brushes are caused to rotate around the armature-shaft and to assume any desired position in relation to the commutator-strips.

It is also obvious that any other force than that of gravity might be used for giving to the armature-shaft a longitudinal motion against the force of magnetism developed between the field-magnet and the armature-core, should it be desired to operate the motor in any other than a vertical position—such a device, for instance, as a spring acting against the free end of the armature-shaft. I prefer, however, the form shown and described in connection with Figs. 1 and 3 of the drawings.

Where motors are used in multiple circuits, I prefer to use the absolute cut-out principle illustrated in Fig. 1, and where they are used in series circuits I prefer to use the shunting principle disclosed in Fig. 2.

I do not limit myself to the specific constructions herein shown and described for carrying out the principle which I believe to be novel with me—namely, that of diminishing the friction of the rotary parts in electric motors—and my claims are directed, broadly, to apparatus by which this principle may be carried into effectual use.

I am aware that electric motors have heretofore been devised in which the armature is withdrawn from and inserted into the magnetic field, and that methods of regulation have been utilized by carrying into effect this principle, and I make no claim, broadly, therefore, to the application of the principle of regulating by withdrawing and inserting the armature in the magnetic field.

Having thus described my invention, what I claim, and desire to secure by Letters Patent of the United States, is—

1. The method of diminishing friction between the rotary and fixed parts of an electric motor, consisting in causing the magnetism developed in the field-magnets and the work done by the motor to act conjointly against the force of gravity on the rotary part and to thereby hold it off its lower end journal-bearing, substantially as described.

2. An electric motor having its armature normally out of circuit and its axle supported in sliding journal-bearings, in combination with a pair of commutator-brushes resting out of contact with the commutator, substantially as described.

3. An electric motor having an armature adapted to slide into and out of the most effective portion of its magnetic field, in combination with a pair of commutator-brushes resting normally out of circuit with the commutator, but adapted to contact therewith as the armature is moved into the effective field, substantially as described.

4. In an electric motor, an armature having longitudinal motion on its journal-bearings and a pair of commutator-brushes resting normally out of contact with the commutator, but in alignment therewith, substantially as described.

5. In an electric motor, an armature having longitudinal sliding motion, a pair of commutator-brushes resting normally out of contact with the commutator, but in alignment therewith, and means, substantially as described, for adjusting the brushes with relation to the lead, substantially as described.

6. A pair of pivoted commutator-brushes located in alignment with the commutator-strips and resting normally out of contact therewith, in combination with means for adjusting said brushes relative to the lead, substantially as described.

7. A pair of commutator-brushes having their contacting ends resting normally on an insulating-ring borne by the armature-shaft, in combination with means for bringing them into contact with the commutator and additional means for adjusting them with relation to the lead, substantially as described.

8. In an electric motor, an armature carried by a shaft having longitudinal sliding motion and provided with a handle or sleeve for shifting the position thereof, substantially as described.

CHARLES J. KINTNER.

Witnesses:
GEO. H. STAYNER,
FRANK GORDON.